US005585136A

United States Patent [19]

Barrow et al.

[11] Patent Number: 5,585,136
[45] Date of Patent: Dec. 17, 1996

[54] METHOD FOR PRODUCING THICK CERAMIC FILMS BY A SOL GEL COATING PROCESS

[75] Inventors: David A. Barrow, Ajax; T. Edward Petroff, Scarborough; Michael Sayer, Kingston, all of Canada

[73] Assignee: Queen's University at Kingston, Kingston, Canada

[21] Appl. No.: 409,127

[22] Filed: Mar. 22, 1995

[51] Int. Cl.$^6$ ............................................. B05D 3/00
[52] U.S. Cl. .................. 427/2.24; 427/376.2; 427/380; 427/419.3
[58] Field of Search ........................ 427/2.24, 376.2, 427/380, 419.3

[56] References Cited

U.S. PATENT DOCUMENTS

| | | | |
|---|---|---|---|
| 4,726,099 | 2/1988 | Card et al. | 29/25.35 |
| 4,738,896 | 4/1988 | Stevens | 428/315.9 |
| 4,814,202 | 3/1989 | Castelas | 427/226 |
| 4,946,710 | 8/1990 | Miller et al. | 427/126.3 |
| 4,970,182 | 11/1990 | Shirasaki | 501/134 |
| 4,990,324 | 2/1991 | Tomita et al. | 423/608 |
| 5,028,455 | 7/1991 | Miller et al. | 427/126.3 |
| 5,066,617 | 11/1991 | Tanemoto et al. | 501/134 |
| 5,091,348 | 2/1992 | Woodhead et al. | 501/136 |
| 5,116,643 | 5/1992 | Miller et al. | 427/126.3 |
| 5,198,269 | 3/1993 | Swartz et al. | 427/226 |
| 5,204,140 | 4/1993 | Grosvenor et al. | 427/126.3 |
| 5,219,611 | 6/1993 | Giannelis et al. | 427/162 |
| 5,260,094 | 11/1993 | Giannelis et al. | 427/79 |
| 5,281,405 | 1/1994 | Harmer | 423/306 |
| 5,308,807 | 5/1994 | Moeggenborg et al. | 501/134 |

OTHER PUBLICATIONS

Yi et al., "Sol–Gel Processing of Complex Oxide Films," Ceramic Bulletin vol. 70 No. 7 1991 pp. 1173–1179.

Primary Examiner—Benjamin Utech
Attorney, Agent, or Firm—Richard J. Hicks

[57] ABSTRACT

A method for producing thick ceramic films of greater than 10 μm on selected substrates is described. Conventional sol gel solutions are loaded with up to about 90% by weight of finely divided ceramic particles and mixed. The resulting slurry or paint can be either spun or dip coated or sprayed or painted onto a planar or other substrate, fired to remove the organic materials and to develop a microcrystalline structure. The fired film may then be heated. Composite films are also contemplated.

18 Claims, No Drawings

METHOD FOR PRODUCING THICK CERAMIC FILMS BY A SOL GEL COATING PROCESS

FIELD OF THE INVENTION

This invention relates to the production of thick ceramic films, including composite films, on selected substrates, using a sol-gel coating technique. More particularly this invention relates to a technique for depositing polycrystalline ceramic films such as lead zirconate titanate and partially stabilized zirconia, in thicknesses greater than 10 μm.

BACKGROUND OF THE INVENTION

Ceramic coatings can be prepared by thermal or plasma spraying and physical vapour deposition (PVD) techniques. In plasma spray, a bulk powder is passed through a plasma and directed towards a substrate where it cools on contact. Films up to 10 mm thick can be produced in this way but usually need post-deposition heating as the deposited film tends to be porous (10% porosity is considered good). Another drawback of the plasma spray technique is that only line of sight geometries can be successfully coated. In PVD, expensive vacuum systems are required to coat high quality ceramic films of less than 10 μm. In addition this technique is also limited to line of sight geometries.

An alternative method, which has gained considerable ground and credibility in recent years, is sol-gel processing. Organo-metallic precursor compounds of the desired ceramic oxides are mixed and dissolved in a suitable solvent. The resultant solution is then hydrolysed to form a structured solution or gel containing organo-metallic polymers or macroclusters. Additives can be added to control the viscosity and surface tension of the sol gel solution. Films are prepared by either spin, dip or spray coating or painting onto an appropriate substrate. The coated substrate is then fired to remove the organic material and a post-fire heating step is usually performed to fully develop the final ceramic structure. The sol gel process has several advantages over other fabrication methods. It is simple, more economically feasible and permits coating of complex geometries, not necessarily line of sight. Usually ceramic films up to about 0.5 μm can be deposited in a single layer but films up to about 3.0 μm have been produced using a complex vacuum controlled firing treatment. Thicker films, up to about 10 μm in thickness have been produced by successive coatings in 0.1 μm layers. Clearly a 10 μm film made 0.1 μm at a time is a very time consuming and laborious process. In order to exploit the desired properties of the ceramic, it is essential that the ceramic film should be crack-free. Sol Gel films are, however, very susceptible to substrate interaction, defects and stresses within the film. Generally the thinner the film the lower the internal stresses and the number of defects. Solvents and organics can escape from 0.1 μm layers relatively easily but for thicker layers this is not so resulting in defects which can act as nucleation centres for crack propagation. Sol gel films are also substrate dependent and most films are limited to metallized silicon or other highly polished substrates. Conventional sol gel technology cannot, therefore, be used to produce thick, large area sol gel films.

OBJECT OF THE INVENTION

An object of the present invention is to provide an improved method for applying adherent ceramic films to metallic substrates in thicknesses greater than 5 μm and at least up to 200 μm without cracking.

Another object is to provide an improved sol-gel process for producing polycrystalline ceramic coatings on a wide range of substrates.

BRIEF STATEMENT OF THE INVENTION

By one aspect of this invention there is provided a process for producing a crack-free polycrystalline ceramic film on a substrate comprising:
(a) mixing a selected organo-metallic sol-gel solution with up to about 90% by weight of said solution of a selected finely divided ceramic powder so as to produce a uniform stable dispersion;
(b) applying said stable dispersion to a selected said substrate so as to provide a coating thereon up to about 6 μm thick; and
(c) firing said coated substrate at a temperature to between 400° and 1000° C. so as to remove organic constituents and produce a stable crack-free polycrystalline metallic oxide film on said substrate.

By another aspect of this invention there is provided a process for producing a crack-free crystalline film selected from stabilized zirconia or titania on a substrate selected from aluminum foil and stainless steel, comprising:
(a) mixing sol gel mixture selected from titania and zirconia and a solution of a metal salt with up to 90% by weight of yttria or ceria stabilized zirconia powder or pure titania powder in a size range between .1 and 10 microns so as to produce a stable dispersion.
(b) applying said stable dispersion to a selected said substrate so as to provide a coating up to 6μm thick; and
(c) firing said coating substrate at a temperature up to about 500° C. so as to produce a stable crack-free polycrystalline film on said substrate.

By yet another aspect of this invention there is provided a process for producing crack-free polycrystalline composite ceramic films on a substrate comprising:
a) mixing a first selected organo-metallic sol gel solution with up to about 90% by weight divided ceramic powder so as to produce a first uniform stable dispersion;
b) mixing a second selected organo-metallic sol gel solution with up to about 90% by weight of said solution of a second selected finely divided ceramic powder so as to produce a second uniform stable dispersion;
c) applying a first coating of one of said first and second stable dispersions to a selected said substrate;
d) firing said first coating at a temperature up to about 1000° C. so as to remove organic constituents and produce a stable crack-free polycrystalline first metal oxide film on said substrate;
e) applying a second coating of the other of said first and second stable dispersions to said oxide film on said substrate;
f) firing said second coating at a temperature up to about 1000° C. so as to remove organic constituents and produce a stable crack-free polycrystalline second metal oxide film on said first metal oxide film.

DETAILED DESCRIPTION OF PREFERRED EMBODIMENTS

As noted above, sol-gel processing techniques first require the preparation of an organo-metallic solution of the desired ceramic oxide precursors in an organic solvent, followed by hydrolysation and pyrolysation to remove the organic phase. Similar techniques are followed in the present invention with the important distinction that the primary organo-metallic solution is mixed with ceramic particles and subjected to ultrasonic mixing to form a sol gel based paint which can be deposited on simple or complex geometry substrates by either spin, dip or spray coating or painting, followed by hydrolysation, pyrolysation and heating in air. Typical formulations are described below and it is emphasized that these formulations are not critical but may be varied widely.

Preparation of Organo-metallic solutions (a) PZT Solutions 6 g of lead acetate or lead nitrate was dissolved in 4 g glacial acetic acid. 3.96 g zirconium propoxide, 2.091 g titanium isopropoxide were mixed so that the molar ratio of $Zr_x + Ti_{1-x} = Pb$, and the lead solution was added to the zirconium-titanium organic solution. 2.5 g of deionized water, 1 g polyethylene glycol and 1 g glycerol were then added to adjust the viscosity.

(b) Stabilized Zirconia Solutions (i) 1–2 g calcium acetate or calcium nitrate or yttrium acetate or cerium acetate was dissolved in 4 g glacial acetic acid. 8 g of zirconium propoxide was then added and the solution was thoroughly mixed. 3 g of deionized water was then added and the viscosity was adjusted by additions of ethylene glycol and glycerol.

(ii) Unstabilized zirconia solution.

Zirconium propoxide, acetylacetone and methoxyethanol were mixed in a molar ratio of 1:1:4. Water, glycerol and ethylene glycol were then added to adjust viscosity.

(c) Alumina Solutions (i) 5 g 2-propanol aluminum derivative was dissolved in 5 ml nitric acid. 2 g propanol was added and mixed. 2 g deionized water and 1 g ethylene glycol was added to adjust viscosity.

(ii) 5 g aluminum propoxide was dissolved in 2 g n-propanol. 2 g deionized water and 0.1 g H Cl were added, followed by 1 g ethylene glycol to adjust viscosity.

(d) Silicon Solution (i) 5 g tetraethylortho silicate was mixed with 2.9 g n-propanol, 2.2 g deionized water and 0.2 g HCl. Ethylene glycol was added to adjust viscosity.

(ii) 8 g of commercially available "spin on glass" (Allied Signal) was mixed with 2 g water. Ethylene glycol was added to adjust the viscosity.

(e) Nickel Zinc Ferrite Solution 1 g nickel nitrate, 1 g zinc nitrate and 1 g iron nitrate were dissolved in 2 g of one of water, methoxyethanol and ethylene glycol, ethylene glycol were added to adjust the viscosity to 20 cp.

(f) Titania Solution 5 g titanium isopropoxide, 1.8–2 g acetylacetone and 1.3–1.5 g methoxyethanol were mixed to provide a molar ratio of 1:1:4. Water, glycerol and ethylene glycol were added to adjust the viscosity to the desired range.

In all cases the viscosity of the solutions was increased, generally by addition of small amounts of ethylene glycol and or glycerol to provide a solution suitable for making a stable dispersion which did not settle when the ceramic powder was added and stirred ultrasonically. Generally solutions having a viscosity in the range 10–50 centipoises, were satisfactory.

Preparation of Sol Gel Paints

Selected ceramic powders were added to the solutions (a)–(f) above and mixed ultrasonically to provide uniform stable dispersions. The powders which ranged in size from 0.1 microns to 10 microns in particle diameter, were used at loadings 5–90% by weight of the solution, with a 50% loading being preferred. Ceramic powders may be selected from a wide range of materials, including alumina, silica titania, zirconia, silicon carbide, titanium carbide and PZT. Preferred ceramic powders in selected sol gel solutions are shown in Table 1 below.

TABLE 1

| Powder | PZT[1] | Zirconia[2] | Alumina[3] | Silica[4] | Nickel Zinc Ferrite[5] | Titania[6] |
|---|---|---|---|---|---|---|
| (Yttria) Zirconia | Yes | Yes | Yes | Yes | No | Yes |
| (Ceria) Zirconia | Yes | Yes | Yes | Yes | No | Yes |
| PZT | Yes | Yes | Yes | Yes | No | No |
| Alumina | Yes | Yes | Yes | Yes | No | No |
| Titania | Yes | Yes | Yes | Yes | No | Yes |
| Calcium Zirconate | Yes | Yes | No | No | No | Yes |
| Silica | No | Yes | Yes | Yes | No | No |
| Silicon Carbide | No | Yes | Yes | No | No | No |
| Titanium Nitride | No | Yes | Yes | No | No | No |
| Calcium Hydroxyapatite | No | Yes | Yes | No | No | No |
| Nickel Zinc Ferrite | No | No | No | No | Yes | No |

The paints prepared above may be applied to any suitable substrate either by dipping, spin coating or spraying or painting as any conventional sol gel is used. Planar, coaxial and complex geometry substrates can be readily coated. Examples of these include metals, inside and outside of tubes, complex objects such as steel nuts and orthopaedic implants. Films of greater than 5 μm and up to at least 200 μm in thickness can be applied by spin coating multiple layers. A single layer up to 6 μm in thickness can be deposited without cracking.

Following deposition of the ceramic/sol gel paint on the substrate, it is heated in air to a temperature between 400° C. and 700° C., depending upon the particular substrate and coating, for a period of 1 to 30 minutes so as to remove the organic materials and form the oxide compounds. After the first firing, additional layers may be deposited and fired until the desired thickness has been obtained. Thereafter, the films may be heated at a temperature between 400° C. and 1000° C., preferably about 550° C. for a period of up to about 4 hours, preferably about 1 hour.

All films were deposited into coupons which were at least 4 cm² in area or rods at least 6 cm in length.

Attempts to deposit zirconia and titania without inorganic additives on to metal substrates had limited success. While it was possible to deposit the material onto aluminium foil, the films on stainless steel spalled off. However by using a PZT sol gel with zirconia and titania powders, it was possible to deposit excellent films onto aluminium, carbon and stainless steel. By modifying the sol gel chemistry it was also possible to deposit good films on these substrates using a lead titanate based and lead zirconate based sol gel with both zirconia and titania. Zirconate and titanate sol gel formulations using a metal cation (strontium, magnesium and calcium) were prepared and filled with either YSZ, CSZ or titania. It was found that while it was possible to produce fair to good films at any concentration of metal cation, the best results were obtained when the stoichiometric ratio of metal cation to either the titanium or zirconium cation in the solution was 1 to 2.5 –3.

Titania films using both the calcium zirconate and calcium titanate sol gel could be deposited onto stainless steel and fired at 700° C. and could be heated at 900° C. However upon cooling from 900° C. to room temperature, the substrate began to bow and the titania coating began to "pop off". The failure of the titania film is believed due to the thermal expansion mismatch between the ceramic and the substrate. Zirconia films were prepared in similar manner as the titania but did not fail. Therefore, it appears that zirconia does not suffer from thermal expansion mismatch as greatly as the titania.

YSZ and CSZ films were prepared using a calcium modified zirconia sol gel solution and were deposited onto soft steel, stainless steel, inconel and carbon/carbon composite. Spin coated films produced excellent results and provided films which were adherent. The surface morphology of these coatings was rough and irregular. However, when electroded with silver paint the films were found to be insulating indicating that they are pin hole and crack-free. Polishing the sample with 0.3 μm diamond paste resulted in smooth and shiny surface on the ceramic. Scanning electrode microscopy observation of the polished sample did not disclose any holes, pores or defects in the sample. Film thicknesses were determined by mounting the sample edgewise in epoxy resin, polishing the edge and comparing the sample to a grid within an optical microscope. The film thickness of a 20 layer coating was 60 μm. A scratch test performed on a 25 layer coating of CSZ on stainless steel indicated that the failure load was between 2.2 and 2.4 kg. CSZ films (20 layers) were prepared by spin coating onto a 2 cm by 3.5 cm inconel coupon, firing at 700° C. and heated overnight at 900° C. The sample was then thermal cycled 10 times from room temperature to 1300° C. The sample showed no delamination or spalling after the test. YSZ and CSZ films were successfully coated onto a variety of substrates, these include soft steel, stainless steel, inconel and carbon/carbon composites coupons and soft steel, stainless steel and inconel rods.

It was found that when processing, different substrates allowed for different heating temperatures before the thermal expansion mismatch became a problem. For Inconel®the sample could be heated at 1000° C. for days without problems upon cooling. However for stainless steel and soft steel the highest heating temperatures were 900° C. and 700° C. before thermal expansion mismatch or degradation of the metal became a problem.

The PZT films produced according to the present invention find industrial application in the production of integrated sensor and actuator devices in which the piezoelectric device and semiconductor circuitry are deposited on the same chip to form so called "smart structures". Piezoelectric PZT films deposited on optical fibres may be used as integrated optical phase modulators or to produce steerable optical fibres. The zirconia and alumina coatings have structural applications. Examples of these are:

1. Protective coatings where the ceramic is used to protect a metallic substrate from heat, corrosion and erosion.
2. Thermal barrier coatings where the ceramic is used to provide a thermal gradient between the surface of the film and the metal substrate. This allows metallic components in turbine engines and heat exchanger to be operated at high temperatures.
3. Performance Enhancing Coatings. In polymer extrusion and moulding applications ceramic coatings improve the rheological and release performance characteristics of plastics.
4. Dielectric Barriers in electronic components where the coating provides an insulating layer barrier between 2 conductors.

EXAMPLE 1

PZT Films

In a typical PZT recipe 4 g of lead acetate was dissolved in 6 g of acetic acid. Heating was often required to fully dissolve the $Pb(OCOCH_3)_2$. After the solution was allowed to cool, 4 g of zirconium propoxide, 2 g of titanium isopropoxide, 2.5 g of distilled, deionized water (DDW), 1 g of polyethylene glycol and 1 g of glycerol were added and well mixed. PZT powder (6 g) was then added to the resulting solution and dispersed by ultrasonic mixing.

Films were deposited onto planar substrates by spin coating and subsequently fired at 400° C. Thicker films were achieved by repeating the sequence until the desired thickness was obtained. The films were then heated at 650° C. for 1 hour. Fibres and wires were coated using an automated dipping system.

PZT films deposited onto planar substrates produced crack free films that were 9–60 μm thick. The films were found insulating indicating that they were pinhole free. Under observation by scanning electron microscopy, the films appeared dense. The dielectric and piezoelectric properties obtained for these films was comparable to bulk material. In fact these films were found to be of sufficient quality to produce piezoelectric cantilevers which were 4 cm long and 0.5 cm wide and, at the fundamental resonance frequencies, vibrate with deflections observable with naked eye (0.8 mm). PZT coatings on fibres and wires achieved coatings of 10–30μm in thickness. These coatings were also of high enough quality to produce an "In-line Optic Phase Modular" device where the PZT was 30 μm thick.

EXAMPLE 2

Zirconia and Titania Films

The development of zirconia and titania films was carried out in two stages. The first stage involved the fabrication of zirconia and titania films without adding inorganic additives to the sol gel solution and the second investigated the use of inorganic additives to improve both the distribution of the particles within the film and its adhesion to substrates.

Titania and zirconia sol gel mixtures were prepared by mixing 4 g of either zirconium propoxide or titanium isopropoxide with 3 g acetic acid, 2 g DDW, 0.5 g polyethylene glycol and 0.5 g glycerol. Either 4 g of yttria partially stabilized zirconia or titania powder was added to the appropriate sol gel solution and the mixture sonified for at least 5 min. The films were then deposited onto aluminium foil and stainless steel coupons by spin coating and firing at 500° C. Films heated above 600° C. tended not to adhere to the substrate and could be rubbed off.

Modified sol gel mixtures were made by adding a metal salt. 2 g of a metal salt (either lead nitrate, lead acetate, calcium nitrate, calcium acetate, strontium acetate, strontium nitrate cerium acetate, cerium nitrate and yttrium acetate and yttrium nitrate) was dissolved in 4 g of acetic acid. To the resulting solution either 8 g of zirconium propoxide or titanium isopropoxide or a mixture of zirconium propoxide (6 g) and titanium isopropoxide (4 g) was added along with 2.5 g DDW, 1 g polyethylene glycol and 1 g glycerol. Ceramic powder (4 g), either yttria or ceria partially stabilized zirconia (YSZ or CSZ) or titania was added to the solution and sonified for at least 5 min. The films were then deposited on to stainless steel coupons as in the previous example and were found to have excellent adhesion. Without wishing to be bound by this explanation it is believed that the added metal cation suppresses the disruptive tetragonal to monoclinic phase change which occurs in zirconia. Sol gel zirconia undergoes a number of phase changes as a result of changes in temperature. Conventional sol gel films (ones prepared without the addition of ceramic powders) are amorphous when deposited at room temperatures. The material becomes tetragonal when heated to between 400–600° C. This phase persists when the material is cooled back down to room temperatures. However, if the film is heated above 600° C. and cooled back to room temperature, the monoclinic phase is also present in the material. This monoclinic phase is 5 volume % larger than the tetragonal. The corresponding variations in the volume throughout the multiphase material causes the ceramic to break apart (resulting in poor adhesion). However, when metal cations such as calcium, magnesium, cerium or yttrium are added to conventional zirconia sol gel solutions, this tetragonal to monoclinic phase transformation is suppressed and the integrity of the ceramic body is maintained throughout the temperature range below 2300° C.

Of the metal cations discussed, calcium is preferred because of its high solubility in all of the solvents used to make the sol gel solutions. Other metal cations, while also capable of suppressing the tetragonal to monoclinic phase change, are not as soluble as calcium and are more difficult to work with.

EXAMPLE 3

Modified Zirconia Films on Other Substrates

Modified sol gel dispersions of CSZ and YSZ were either spin or dip coated onto soft steel, stainless steel, Inconel® and carbon/carbon composite. The dispersions were prepared by dissolving 2 g of calcium nitrate in 4 g of acetic acid. To the resulting solution 8.5 g of zirconium propoxide, 2.5 g DDW and 1 g each of polyethylene glycol and glycerol. Ceramic powder (4 g) was added as before. Coatings on soft steel were fired and heated for at least 8 hours at 500° C. Coatings on stainless steel and Inconel® were fired at 700° C. and heated for at least 8 hours at 700° C. and 900° C. respectively. Coatings on carbon/ carbon composites were fired at 450° C. Rods of carbon steel, stainless steel and inconel were dip coated and fired and heated in a manner similar to the coupons.

EXAMPLE 4

Bio-inert Films

Calcium zirconate coatings were deposited onto stainless steel coupons by spin coating, firing at 700° C. and heating at 900° C. for at least 8 hours. The calcium zirconate sol gel was prepared by dissolving propoxide (8.5 g), DDW (2.5 g) and 1 g each of polyethylene glycol and glycerol. Calcium zirconate powder (4 g) was added to the resulting solution and dispersed by sonifying for at least 5 minutes.

EXAMPLE 5

Dielectric Layer

Dielectric coatings have been fabricated by dip and spin coating multiple layers of either ceria stabilized zirconia (CSZ) or alumina films onto alumina substrates. These coatings which range from 10–60 μm in thickness have withstood RF voltages of up to 3.2 kV.

EXAMPLE 6

Painted Nuts

CSZ films have been deposited on stainless and carbon steel nuts by painting multiple layers and heating to 500° C. for 24 hours.

EXAMPLE 7

Inside/Outside of Tubes

A 1½ inch diameter carbon steel tube was coated on both the inside and outside with CSZ by dip coating multiple layers.

EXAMPLE 8

Capillary Die for Extrusion of Polymeric Materials

A 6.4 mm internal diameter tube, 4 cm long, was dip coated on the inside with a CSZ film of 50 μm thickness. The fired coating improved extrusion speed and surface equality of polymers produced, as compared to uncoated capillary dies.

EXAMPLE 9

High frequency transducers which exhibit thickness mode resonance in the frequency range 35–60 MHz have been fabricated by depositing PZT coatings on aluminum substrates.

EXAMPLE 10

Quenching

CSZ on a carbon steel plate (4"×2") was quenched from 550° C. to room temperature by immersing it in cold tap water. The coating remained intact with no spalling.

EXAMPLE 11

Silicon Carbide Films

Silicon carbide (4 g) (1–10 micron, Johnson Mathey) as added to a solution of $Ca(NO_3)_2$ (2 g), acetic acid (3 g), zirconium isopropoxide (8 g), water (1 g), glycerol (1 g) and poly(ethylene glycol)(1 g). Ten layers were deposited on a silicon substrate by spin coating and fired at 600° C. between each coating. The film was then heated overnight at 600° C. The resulting films were adherent and SEM analysis showed them to be dense and approximately 12–15μm in thickness.

EXAMPLE 12

Titanium Nitride Films

Titanium nitride (1–10 micron, Johnson Mathey) (4 g) as added to a solution of $Ca(NO_3)_2$ (2 g), acetic acid (3 g), zirconium isopropoxide (8 g), water (1 g), glycerol (1 g) and poly(ethylene gylcol) (1 g). Ten layers were deposited on a silicon substrate by spin coating and fired at 600° C. between each coating. The film was then heated overnight at 600° C. The resulting films were adherent and SEM analysis showed them to be dense and approximately 12 μm in thickness.

EXAMPLE 13

Silicon Carbide/Titanium Nitride Layered Composite

A silicon carbide paint and titanium nitride paint were prepared as in Examples 11 and 12 respectively. Alternating layers were applied by spin coating and fired at 600° C. between each coating. The film was then heated overnight at 600° C. The resulting films were adherent and SEM analysis showed them to be dense and approximately 12 μm in thickness.

We claim:

1. A process for producing a polycrystalline ceramic film on a substrate comprising: (a) mixing a organo-metallic sol-gel solution with up to about 90% by weight of said solution of a ceramic powder so as to produce a uniform stable dispersion; (b) applying said stable dispersion to a substrate so as to provide a coating thereon up to about 6 μm thick; and (c) firing said coated substrate at a temperature up to about 1000° C. so as to remove organic constituents and produce a stable polycrystalline metallic oxide film containing said ceramic powder on said substrate.

2. A process as claimed in claim 1 wherein steps (b) and (c) are repeated at least five times so as to produce a stable crack-free polycrystalline film at least 10 μm thick.

3. A process as claimed in claim 1 including the step of heating said metallic oxide film on said substrate at a temperature up to about 1000° C. after said firing.

4. A process as claimed in claim 1 wherein said ceramic powder is selected from the group consisting of stabilized Zirconia, stabilized Zirconia, PZT, Alumina, Titania, Calcium, Zirconate, Silica, Silicon Carbide, Titanium Nitride, Calcium-Hydroxyapatite, and Nickel Zinc Ferrite.

5. A process as claimed in claim 4 wherein said sol-gel solution is selected from the group consisting of PZT, Zirconia, Alumina, Silica, Nickel Zinc Ferrite and Titania solutions.

6. A process as claimed in claim 1 wherein said film is selected from the group consisting of a, bio-inert film, and a dielectric film.

7. A process as claimed in claim 6 wherein said bio-inert film comprises calcium zirconate.

8. A process as claimed in claim 6 wherein said dielectric film is selected from the group consisting of alumina, calcium-modified zirconia., and ceria stabilized zirconia.

9. A process as claimed in claim 1 wherein said substrate is selected from the group consisting of stainless steel and carbon steel nuts, carbon steel tubes, carbon steel plates, and aluminum substrates.

10. A process as claimed in claim 9 wherein said substrate is a carbon steel tube and said film is deposited on inside and outside surfaces thereof.

11. A process as claimed in claim 1 wherein said film is crack-free.

12. A process for producing a polycrystalline film selected from the group consisting of zirconia and titania on a substrate selected from the group consisting of aluminum foil and stainless steel, comprising:

(a) mixing a sol-gel mixture selected from the group consisting of titania and zirconia and a solution of a metal salt with up to 90% by weight of a yttria stabilized powder selected from the group consisting of titania and zirconia in a size range between. 1 and 10 microns so as to produce a stable dispersion;

(b) applying said stable dispersion to said substrate so as to provide a coating up to 6 μm thick; and (c) firing said coated substrate at a temperature up to about 500° C. so as to produce a stable polycrystalline film on said substrate.

13. A process as claimed in claim 12 wherein said film is crack-free.

14. A process for producing polycrystalline composite ceramic films on a substrate comprising:

(a) mixing a first organo-metallic sol-gel solution with up to about 90% by weight of a first ceramic powder so as to produce a first uniform stable dispersion;

(b) mixing a second organo-metallic sol-gel solution with up to about 90% by weight of said solution of a second ceramic powder so as to produce a second uniform stable dispersion;

(c) applying a first coating of one of said first and second stable dispersions to said substrate;

(d) firing said first coating at a temperature up to about 1000° C. so as to remove organic constituents and produce a stable polycrystalline first metal oxide film containing a respective one of said ceramic powders on said substrate;

(e) applying a second coating of the other of said first and second stable dispersions to said first oxide film on said substrate; and (f) firing said second coating at a temperature up to about 1000° C. so as to remove organic constituents and produce a stable crack-free polycrystalline second metal oxide film containing the respective other one of said ceramic powders on said first metal oxide film.

15. A process as claimed in claim 14 wherein steps (c), (d), (e) and (f) are repeated so as to produce a composite metal oxide layer at least 10 μm thick.

16. A process as claimed in claim 15 wherein said first ceramic powder is silicon carbide and said second ceramic powder is titanium nitride.

17. A process as claimed in claim 16 wherein said first and second organo-metallic sol gel solutions are the same.

18. A process as claimed in claim 14 wherein said films are crack-free.

* * * * *

UNITED STATES PATENT AND TRADEMARK OFFICE

CERTIFICATE OF CORRECTION

PATENT NO.: 5,585,136

DATED: December 17, 1996

INVENTORS: David A. Barrow, T. Edward Petroff and Michael Sayer

It is certified that error appears in the above-identified patent and that said Letters Patent are hereby corrected as shown below:

In claim 12, line 9 (column 10, line 15) should read, "in a size range between 0.1 and 10".

Signed and Sealed this

Sixteenth Day of September, 1997

*Attest:*

BRUCE LEHMAN

*Attesting Officer*   *Commissioner of Patents and Trademarks*